May 10, 1966     M. H. CHERIS     3,250,051
PRE-FORMED ANGLE BAR WITH BOLT-RECEIVING SLOTS
Filed July 2, 1964     3 Sheets-Sheet 1
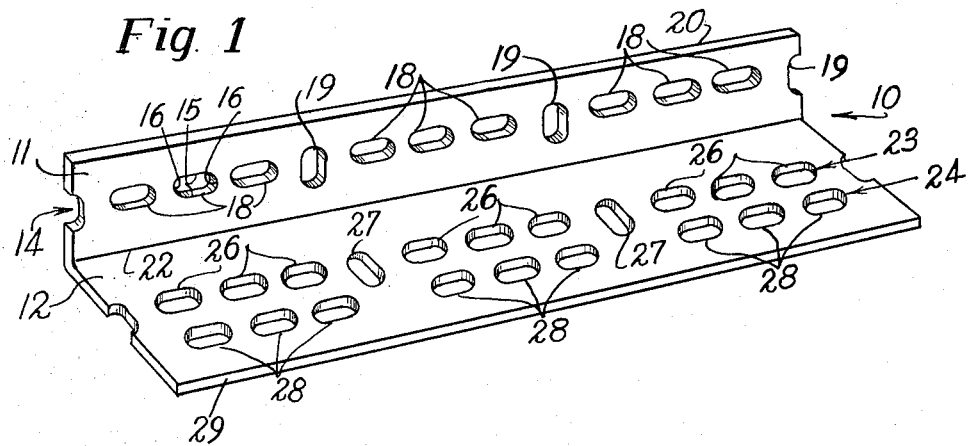
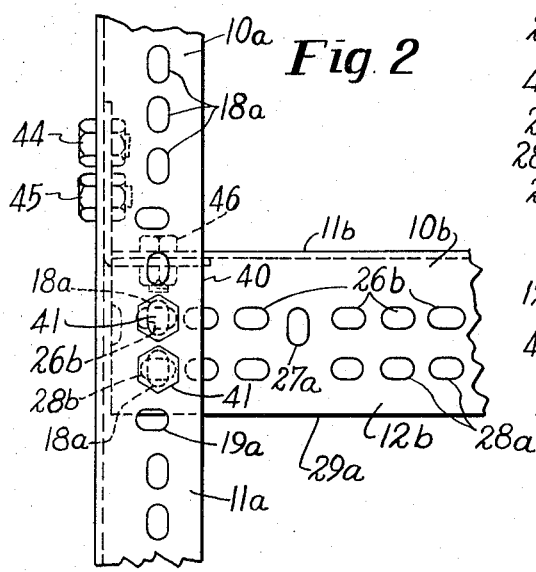
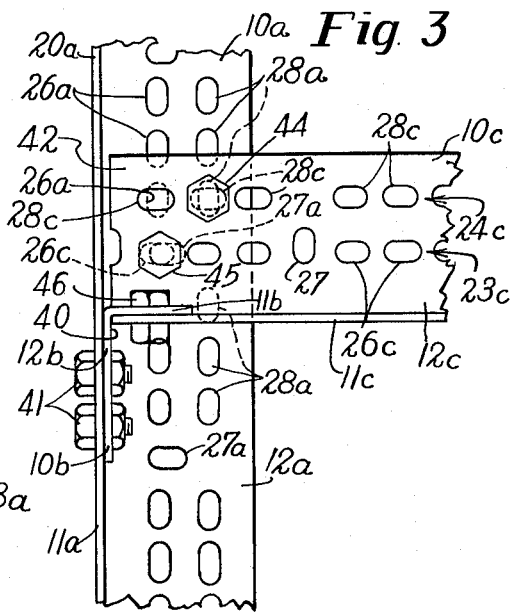
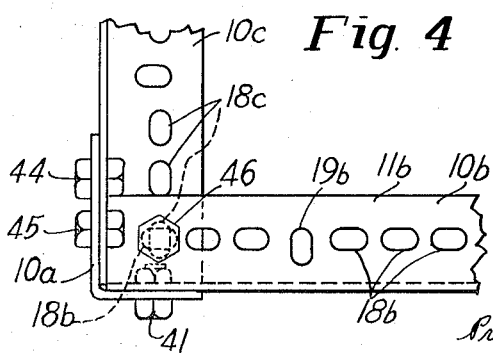
INVENTOR.
Maynard H. Cheris
BY Prangley Baird Clayton Miller & Vogel.
Attys.

INVENTOR.
Maynard H. Cheris

May 10, 1966 M. H. CHERIS 3,250,051
PRE-FORMED ANGLE BAR WITH BOLT-RECEIVING SLOTS
Filed July 2, 1964 3 Sheets-Sheet 3
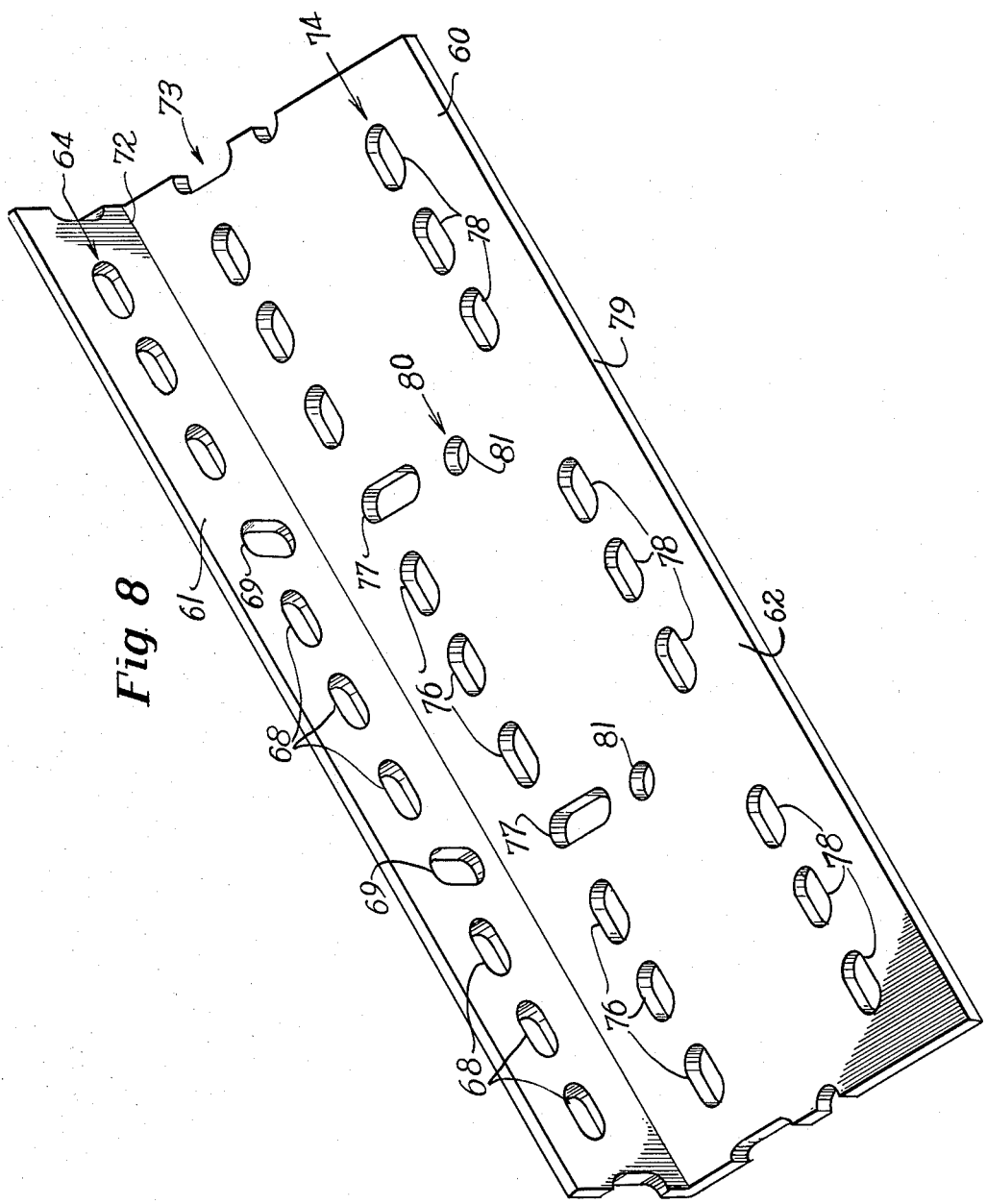
INVENTOR.
Maynard H. Cheris
BY
*Prangley Baird Clayton Mills & Vogel*
Attys.

United States Patent Office 3,250,051
Patented May 10, 1966

3,250,051
PRE-FORMED ANGLE BAR WITH BOLT-RECEIVING SLOTS
Maynard H. Cheris, Elk Grove Village, Ill., assignor to Lyon Metal Products, Incorporated, Aurora, Ill., a corporation of Illinois
Filed July 2, 1964, Ser. No. 382,682
16 Claims. (Cl. 52—634)

This application is, in part, a continuation of copending application Serial No. 844,082, filed October 2, 1959, now abandoned.

This invention relates to improvements in structural elements. More particularly, it relates to fabricated or pre-formed structural elements of angle bar form, as L section bars, wherein the angularly related bar-forming flanges contain bolt-receiving apertures or slots of improved character.

An object of the invention is to provide a pre-formed structural element of angle bar type, having in the flanges thereof bolt-receiving slots of improved character and relatively arranged in improved manner throughout the flange length, whereby the element may be joined in rigidly secure, bolted connection to another or other like elements, with the joined elements extending at substantially any desired angle to each other, including right angle or parallel relationships thereof.

Another object of the invention is to provide a pre-formed structural element of improved flange slotted character as indicated in the foregoing object, which may be combined with other like elements in appropriate lengths, to form substantially any desired frame or structural combination or assembly.

Another object of the invention is to provide a pre-formed element of angle bar type, having in its flanges bolt-receiving slots of such improved form and so relatively arranged throughout the flange length as to permit ready formation of any of a large number of different element joints or assembly of like elements, as well as to allow relative adjustability of the elements in assembly thereof.

A still further object of the invention is to provide a pre-formed structural element of angle bar type, having in the flanges thereof bolt-receiving slots of improved character and relatively arranged in an improved manner throughout the flange length so that the element may be joined in rigidly secure, bolted connection to another or like elements, with the joined elements extending at substantially any desired angle to each other, including right angle or parallel relationships thereof, and at the same time retains the maximum structural strength consistent with such versatility in use.

Another object of the invention is to provide a pre-formed structural element of the improved character hereinbefore noted, which may be stocked in predetermined or standard lengths, and supplied in desired number for cutting to appropriate lengths for forming any desired frame or structural assembly.

In order that the invention may be better understood reference is made to the accompanying drawings which form a part of this specification and in which:

FIGURE 1 is a perspective view of a preferred form of structural element in accordance with the present invention;

FIGURE 2 is an elevational view of three such elements in relative right angular connection;

FIGURE 3 is a side elevational view of the joined elements of FIG. 2;

FIGURE 4 is a top elevational view of the joined elements of FIGURE 2;

FIGURE 8 is a perspective view of another preferred form of structural element in accordance with the present invention.

Figure 5:
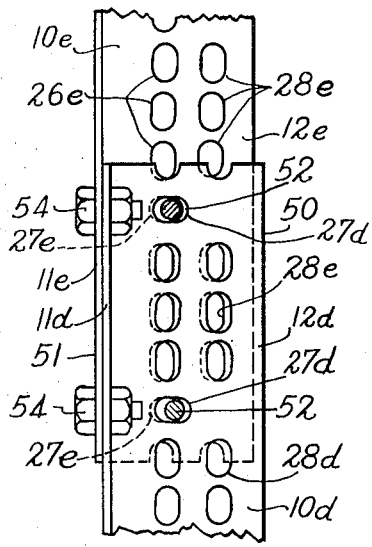
FIGURE 5 is an elevational view of elements in telescoped, spliced connection.

Referring first to FIGURE 1, the presently preferred form of structural element as there shown, comprises an L section angle member or angle bar 10 providing substantially right angularly related longitudinal flanges 11 and 12 both preferably of the same thickness or gauge. The flange 12 has a width or transverse dimension appreciably greater, as to a predetermined desired extent, than the corresponding dimension of the flange 11. As provided in stock form to be supplied for cutting into appropriate lengths for structure formation, such angle bar may have a predetermined or standard length for the purpose, which for example may be, say, ten feet.

Provided in the flange 11 of lesser width are a plurality of bolt-receiving apertures or elongate slots in a single series 14 thereof extending longitudinally throughout the flange length. The slots are identical in form and size, each having parallel straight sides 15 and rounded or semi-circular ends 16. As shown, the series arrangement of the slots is such as to provide in alternate order throughout the flange length, a group of slots 18 (being three slots in the present example) elongated in the longitudinal direction of the flange and a single slot 19 elongated in the transverse direction of the flange. Moreover, the lengthwise axes of all the slots of slot groups 18 lie in a single line longitudinally of the flange, which line parallels the flange outer margin or edge 20 inwardly thereof and relatively near the longitudinal center axis of the flange. The outer end of each slot 19 lies substantially on the line longitudinally of the flange containing the outer sides 15 of the slots 18, so that each slot 19 thus extends inwardly beyond the inner sides of slots 18 toward the longitudinal juncture 22 of flanges 11 and 12. Slots 19 contribute to the capability of joint formation, as will appear hereinafter. Furthermore, the slot center-to-center spacing of all slots 18 is uniform, and is equal to the spacing distance longitudinally of the flange, between the lengthwise center line or axis of each slot 19 and the slot center of the adjacent slot 18 on either side of slot 19. Thus from the foregoing, it will appear that the slots of series 14 are disposed in a generally regularly spaced arrangement throughout the indicated series.

The wider flange 12 is provided with two generally parallel series 23 and 24 of bolt-receiving apertures or elongate slots which are identical in form and size to the slots of series 14. The inner slot series 23 has its slots arranged in the same way as the single slot series 14 with one exception. Thus, the series 23 provides in alternate order throughout the flange length, a group of slots 26 (three in the present example) elongated in the longitudinal direction of the flange and a single slot 27 elongated in the transverse direction of the flange. As in the single series of slots in flange 11, each slot 27 has one end in alignment with one of the sides of slots 26 but, in contrast to the series 14, the slots 27 have the inner ends which are adjacent to the flange juncture 22 aligned with the inner sides of the slots 26 so that slots 27 extend outwardly beyond the outer sides of the latter slots toward the outer slot series 24. However, the center-to-center spacing of slots 26 and the equal spacing between the lengthwise center line or axis of each slot 27 and the slot center of the adjacent slot 26 on each side thereof, are identical to such spacing in the single slot series 14.

The slots 28 of the outer slot series 24 are all elongated in the longitudinal direction of the flange, with their lengthwise axes in a common line parallel to the flange juncture 22 and spaced outwardly from the common line in which the lengthwise axes of slots 26 lie a distance substantially equal to the center-to-center spacing of the slots in the series 14 and 23 so that they are located approximately midway between the latter series and the longitudinal margin or edge 29 of the flange 12. Series 24 is similar to series 23 in that the slots 28 are provided in groups of three spaced apart identically the same uniform distance as that between slots 26 but differs from series 23 in that there is no slot corresponding to slot 27 although the spacing between the end slot in each group of three slots 28 and the adjacent end slot in the next adjacent group of three slots is the same as that between the corresponding slots in series 23.

It will further be noted that the groups of three longitudinally elongated slots in all three of the series 14, 23 and 24 are each in alignment transversely of the structural element or angle bar with the corresponding groups in each other series. Similarly, the slots 19 in series 14 are aligned transversely with the slots 27 in series 23. Consequently, like the single slot series 14, the slots of the slot series 23 and 24 are disposed in a generally regularly spaced arrangement throughout the length of the bar flange 12, except for the double spacing between the successive groups of three slots 28 in the series 24 which results from the fact that this series does not contain any slots corresponding to slots 19 and 27.

As hereinbefore stated, the slots of the slot series 14, 23 and 24 are identical slots, all having the same form and size. Also, as has been determined in practice, to provide the maximum structural strength consistent with versatility in use, it is important that the slots have the proper dimensions and spacing both laterally and longitudinally of the bar 10. To this end, it is preferable that the dimensions of the slots be such that the overall slot length (including the rounded slot ends) is of the order of, or approximately, one and one-half times the slot width. In such slot dimensioning, the slot width is selected to accommodate with desirable clearance, assembly bolts of a size fully adequate to assure firm and rigid connections of joined bar elements. In respect to the relative center-to-center spacing of the slots in each slot series 14 and 23 (including the center line spacing of slots 19 and 27 relative to the center of the adjacent slot on either side of each such slot 19 and 27), such center-to-center spacing is of the order of twice the slot width. Also, in the slot series 24, the center-to-center spacing between the slots 28 in each group of three is the same as that in the other series being of the order of twice the width but, as will be apparent, the center-to-center spacing between the end slot in a group of three and the nearest end slot in the adjacent group is of the order of four times the slot width.

Moreover, the slots 18 of the single series 14 in flange 11, and the slots 26 of the inner series 23 in flange 12, are spaced from the outside of the flange juncture 22 such that the distance from the latter to the longitudinal center line of the respective slots 18 and 26 is the same and substantially equal to two and one-half times the slot width. Also, the center-to-center transverse spacing of the slots 26 and 28 in the respective slots series 23 and 24, is preferably approximately equal to twice the slot width, while the minimum distance between the rounded ends of adjacent slots 18 in series 14, slots 26 in series 23 and slots 28 in series 24, is of the order of one-half the slot width. In addition, the slots 19 which are uniformly spaced throughout the slot series 14, as well as the like uniformly spaced slots 27 in series 24, have a center-to-center spacing of each adjacent pair thereof, in the order of eight times the slot width.

The foregoing dimensional characteristics of the presently improved slotted angle bar, including the identical form and size of all slots and the transverse alignment of the slots of the several series, contribute very materially to ready and economical formation of the slotted angle bar, and greatly enhance the rigidity and uniform structural strength of the bar throughout its length. It is apparent in such respects, that in punching or die-cutting the slotted bar, only a single form and size of punch or cutting die is required, thereby affording a distinct advantage over slot-forming operations requiring cutting dies of different forms, as in the instance of prior slotted bars having slots varying in form and size throughout the bar length. Also, by providing identical slots in generally regularly spaced arrangement longitudinally in the bar, with the slots aligned transversely therein, the slotted bar according to the present invention is of substantially uniform constructural character in all longitudinal sections thereof, which results in desirable uniformity of bar strength throughout its length. At the same time, the uniformity of slot form and size, the relative spacing and arrangement of the slots in the several series, and the relative spacing of the slot series in the flanges, have been found to afford in practice, a desirably great flexibility in respect of the number of different joint formations which may be made with like elements, thereby permitting the construction of any of a great variety of frames and structures. It is to be noted also, that the regularly spaced slots 19 and 27 which are elongated transversely of the bar, may serve advantageously as bar cutting indicia, in the measurement and cutting of the angle bars to desired lengths.

As one example of a structural element in accordance with the present invention, a slotted angle bar found suitable for most purposes, may be formed from metal stock of about .080 inch gauge. In such bar, the inside width of the narrow flange may be about 1½ inches, and the inside width of the other or wide flange may be about 2¼ inches, while the identical slots each have a length of approximately $9/16$ of an inch and a width of approximately $6/16$ of an inch. Also, the center-to-center spacing of the slots in each series (as hereinbefore defined) amounts to substantially ¾ of an inch. The remaining dimensional factors, as hereinbefore indicated, follow in accordance with the slot width. The slots having a width as indicated, thus will accommodate with desirable clearance for ready joint application, $5/16$ inch assembly bolts. Moreover, in the example given, the relative center-to-center spacing of the slots 19, and of the slots 27, is substantially 3 inches (8 times the slot width of $6/16$ inch). Thus, for length cutting of the bar, these slots may serve as cutting indicia, since they afford conveniently for such purpose a length gradation in 3 inch steps throughout the bar length.

While, obviously, it is not feasible here to illustrate all or a great many of the different joints or modes of conjunction which may be attained between two, three or more of the presently improved slotted angle bars, a few examples of possible joints are shown by FIGURES 2 through 7 to which reference now will be made.

In the example of FIGURES 2 to 4, three slotted bar elements are joined together with each extending at a right angle to each of the other two elements. Such a joint may be one encountered, for instance, in the construction of a shelf framework, providing corner uprights, horizontal shelf supports and braces. The bar element 10a thus may be considered as a vertical or corner upright member, to which is bolted one end 40 of a horizontally extending bar element 10b which may be a shelf support. The bar 10b is positioned with its narrow flange 11b uppermost and such that its wide flange 12b at end 40, engages against the inside surface of narrow flange 11a of bar 10a, with the end slots 26b and 28b (both appearing in dotted lines in FIGURE 2) of bar 10b each opposite one of an adjacent pair of slots 18a (appearing in dotted outline in FIGURE 2) of bar 10a. Attachment bolts 41 are applied through the indicated opposed slots to secure these two elements together. It will be noted that since these slots are of elongated character according to the invention, the slots 26b and 28b, respectively, cross or overlap the associated slots 18a in 90 degree relation thereto, because of the right angular relation of the bars 10a and 10b. Consequently, the crossed or overlapping slots afford a degree of positional adjustability of bar 10b relative to bar 10a in bolting of the bars, as before the bolts are drawn up tight the bar 10b may be shifted horizontally and vertically within limits determined by the slot size, the particular overlapping relation of slots and the diameter of the attachment bolts utilized.

The slotted bar 10c, which here may be a brace member, is disposed horizontally and at a right angle to bar 10b (FIGURES 3 and 4) with its narrow flange 11c lowermost. It is positioned to have its end portion 42 related to the other bars such that the narrow flange 11c underlies the narrow flange 11b at end 40 of bar 10b, while its wide flange 12c extends between the end of flange 11b and wide flange 12a and engages against the latter. The bar end 42, as so positioned, has the end slot 26c (in dotted outline in FIGURE 3) of the slot series 23c substantially in registry with a slot 27a of bar 10a. The end slot 28c and the next adjacent slot 28c' of the slot series 24c are located, respectively, in overlapping 90 degree relation to a slot 26a and a transversely aligned slot 28a. Thus, while bolts may be passed through any or all of the foregoing sets of overlapping slots, two bolts 44 and 45 are here utilized (FIGURE 3) in diagonal relation to flange 12c. Bolt 44 extends through the overlapped slots 28c' and 28a, while bolt 45 extends through the substantially registering slots 26c and 27a. In addition, and since in the present joint the end slots 18b and 18c (the latter shown in dotted outline in FIGURE 4) in the narrow flanges of the respective bars 10b and 10c overlap with clearance sufficient for bolt reception, a bolt 46 is applied through these slots to contribute to the rigidity of the particular joint illustrated. It is to be noted, also, that the bar 10c is subject to a degree of adjustability in the joint within the limits as indicated in respect to bar 10b.

The presently improved angle bar slot arrangement, including the uniform slot size and general regularity of slot spacing in the several series of slots, affords a distinct advantage, in that the horizontal bar 10b together with the bar 10c, may be assembled in like manner to the bar 10a at any one of a plurality of points therealong. Thus, bars 10b and 10c occupying the relative positions shown, may be shifted upwardly or downwardly on bar 10a to a minimum extent corresponding to the center-to-center distance between adjacent slots longitudinally of the bar 10a, or to any greater extent corresponding to a multiple of such center-to-center slot distance.

Where it is desired to extend the length of one structural element, such may be accomplished by splicing a second structural element thereto. A splice joint suitable for this purpose is illustrated by FIGURE 5. As there shown, structural elements 10d and 10e have respective end portions 50 and 51 overlapping or in telescoped relation, wherein the respective narrow flanges 11d and 11e are in engagement, while the respective wide flanges 12d and 12e are similarly engaged. In such joint one element is displaced laterally of the other to an extent corresponding to the element thickness or gauge, so that the longitudinally elongated slots normally will not register sufficiently for bolt reception. However, the element 10d may be longitudinally shifted to bring its transversely elongated slots 27d of wide flange 12d at end 50, into overlapping relation to the corresponding slots 27e in the end portion 51 of element 10e. These slots register sufficiently to accommodate securing bolts, as such bolts are shown in section at 52. Because the transverse slots in the narrow flanges are in transverse alignment with the transverse slots (27d and 27e) in the wide flanges of the structural elements (as fully described hereinbefore), positioning of the element ends 50 and 51 in the splice joint as shown, serves also to effect overlap of the transverse slots (not shown) of narrow flanges 11d and 11e. Thus, securing bolts 54 may be applied through such overlapping transverse slots.

It is to be noted further in respect to the joint of FIGURE 5, that element 10d may have its end 50 applied to end 51 of element 10e such that each of the transverse slots 27d will overlie one of the slots 27e of element 10e. These slots in such relationship will accommodate securing bolts, as will the slots 19d and 19e in the similar relationship obtaining in the narrow flanges 11d and 11e, so that an equally effective joint may be effected in this manner.

Figure 6:
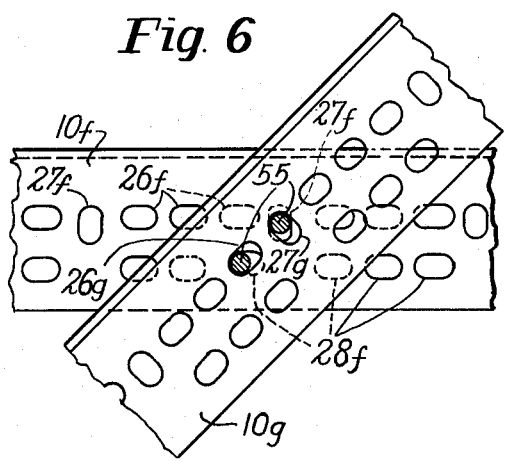
FIGURES 6 and 7 are elevational views illustrating elements joined at other than a right angle.

FIGURE 6 illustrates two structural elements 10f and 10g in relatively crossed disposition, back to back, over the wide flanges thereof and with the element 10g extending at an angle of approximately 45° to element 10f. In such angular arrangement, two adjacent slots 26 and 27g angularly overlap, respectively, a slot 28f and slot 27f in element 10f, with such overlap sufficient to accommodate securing bolts indicated in section at 55.

Figure 7:
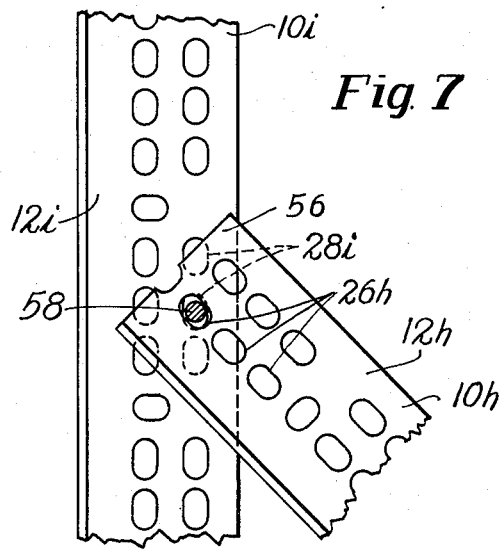

FIGURE 7 shows an element 10h extending at an angle to an element 10i and having the wide flange 12h at its end portion 56, seated against the inside surface of wide flange 12i of element 10i. As so related, at least one slot as 26h of element 10h, will angularly overlap a slot such as 28i in element 10i, to accommodate a securing bolt shown in section at 58.

Referring now to FIGURE 8, it will be seen that it shows another form of structural element 60 which is designed to be larger and stronger than the element 10 previously described and which also embodies a feature not included in that element. Element 60 is, however, an L section angle member or angle bar like element 10 comprising substantially right angularly related longitudinal flanges 61 and 62 both preferably of the same thickness or gauge, which is preferably greater than that preferred for element 10. The width or transverse dimension of flange 61 as shown is the same as that of flange 11 but flange 62 is substantially wider than flange 12 as will appear. Like element 10, this element 60 as provided in stock form for cutting or splicing into appropriate lengths for structure formation may have a predetermined or standard length for the purpose of, for example, about 10 feet.

The flange 61 like flange 11 is provided with a plurality of bolt-receiving apertures or elongate slots in a single series 64 extending longitudinally throughout the flange length. These slots are identical in form, size, alignment, arrangement and spacing from each other and from the flange juncture 72 with the slot series 14 in flange 11. Thus, there are slots 68, in groups of three corresponding to slots 18 and slots 69 corresponding to slots 19.

The wider flange 62 is provided with two generally parallel series 73 and 74 of bolt-receiving apertures or elongate slots which are identical in form and size to the slots of series 14 and 64. The slot series 73 is also identical in form, size, alignment, arrangement and spacing from the flange juncture 72 with the slot series 23 previously described. It thus includes groups of three longitudinally elongated slots 76 alternated with a laterally elongated slot 77. The slot series 74 is similarly identical with series 24 in form, size, alignment, arrangement and spacing from the flange margin or edge 79 but differs in its spacing from series 73 because of the greater width of flange 62. It thus consists of groups of three longitudinally elongated slots 78.

The slot structure of flange 62 also differs from that of flange 12 in that flange 62 is provided with a third longitudinally extending slot series 80 located approximately midway between the series 73 and 74. The slots 81 in series 80 also differ from all the other slots in element 60 in that they are circular rather than elongated. As may be seen, the diameters of these slots 81 are substantially equal to the width of the elongated slots and the slot series 80 is limited to one slot 81 for each slot 77 in series 73, the centers of slots 81 being aligned laterally of element 60 with the longitudinal axes of the slots 77. In flange 62 the spacing between the longitudinal axes of slots 76 and 78 is preferably four times the slot width and consequently the centers of slots 81 lie on a line spaced from each of these axes by a distance equal to twice the said slot width. As in element 10 the groups of three slots in the three series 64, 73 and 74 are in alignment laterally of the structural element or bar and the slots 69, 77 and 81 are similarly aligned laterally of the element 60. Thus, like the single slot series 64, the slots of all three of the slot series 73, 74 and 80 are disposed in a generally regularly spaced arrangement throughout the length of the flange 62.

By way of example, a structural element of the type of element 60, above described, may be formed from metal stock of about .104 inch gauge. The narrow flange 61 preferably has the same inside width as flange 11, i.e., about 1½ inches but flange 62 is preferably formed with an inside width of about 3 inches. As previously indicated, the slot size, width and spacing in element 60 is preferably the same as that in element 10 with two exceptions. In flange 62 the lateral spacing between the longitudinal center lines of slots 76 and 78 in the slot series 73 and 74 is equal to substantially four times the slot width or 1½ inches instead of the ¾ of an inch provided between series 23 and 24. Also, the slots 81, as previously described, are round instead of elongated and preferably have a diameter of substantially 9/16 of an inch and their centers lie on a line spaced laterally from each of the lines on which the longitudinal center lines of slots 76 and 78 are located a distance of substantially ¾ of an inch.

The elements 60 like elements 10 may be joined together or to elements such as 10 in the same wide variety of ways in which elements 10 may be joined as pointed out above. As will be apparent, the various exemplary forms of joints between elements 10 which are shown in the drawings may also be formed between elements 60 or between elements 60 and elements 10 as well as a wide variety of other joints and structures. Element 60 because it is formed of heavier stock and is provided with a wider flange 12 is particularly suited for use where the construction requires a ruggedness and strength greater than that possessed by the element 10. Also, the presence of the slots 81 in the element 60 facilitates its use in forming more rigid joints in which relative movement between the elements is restricted or substantially completely prevented.

It is a particular advantage of the pre-formed structural elements of the present invention as compared with somewhat similar elements heretofore known which were formed of material of the same inherent strength and thickness that the present elements have the same versatility in use as the previously known elements but at the same time possess substantially greater structural strength. In these previously known elements which are comparable with the element 10 shown in FIGURE 1 of the drawings herein, the pattern of holes and width of the narrower flange of the angle were identical with the pattern in slot series 14 and with the width of flange 11 of the said element 10. The differences are found between the pattern of holes in flange 12 as shown in the drawings of this application and the pattern of holes in the flange of like width in the previously known angles.

Thus, in the previously known angles in the slot series which was otherwise identical in pattern and location with series 23, there was no slot like the slot 27 in series 23 in flange 11 but in its place there was a slot elongated longitudinally of the flange as are slots 26 and otherwise identical with those slots 26 and spaced from the adjacent slots corresponding to slots 26 the same distance provided between each adjacent pair of slots 26 in each of the groups of three as shown in FIGURE 1. In other words, in the previously known elements the series of slots corresponding to series 23 was a continuous row of slots identical as to size and orientation with the slots 26 and uniformly spaced apart throughout the full length of the flange the same distance as that between the adjacent pairs of slots in the groups of three slots 26 in element 10.

The previously known elements also included a series of slots corresponding to series 24 in element 10 but the series in the previously known elements, while containing slots identical in size, spacing, grouping, and orientation with the slots 28 in series 24 in element 10, also included laterally elongated slots identical in size and shape with slots 28 and positioned midway between each adjacent pair of the groups of three longitudinally elongated slots. These laterally elongated slots were positioned so that the outer end (i.e., the end remote from the flange juncture) of each of them was located substantially on the line longitudinally of the flange containing the outer sides of the longitudinally elongated slots in the same series, so that each of the laterally elongated slots extended inwardly beyond the inner sides of the longitudinally elongated slots in the same series and toward the flange juncture.

Except as already indicated, the above described previously known structural elements were identical with the element 10 shown in FIGURE 1. More particularly, the groups of three longitudinally elongated slots in the one series containing such groups were laterally aligned with the corresponding groups in the other series containing such groups and each slot in the groups was aligned laterally with a slot in the series containing only longitudinally elongated slots. The various slot series were likewise positioned, respectively, relative to the flange juncture and the edges of the flanges in exactly the same relation as the three series of slots in element 10.

There are other previously known structural elements which are comparable with the structural element 60 shown in FIGURE 8 herein. These previously known elements differed from the element 60 in substantially the same respects in which the element 10 differs from the previously known elements with which it is compared hereinbefore but were otherwise identical with the element 60 in all respects. Thus, all the differences are found in the slot series 73 and 74, series 64 and series 80 being identical with the corresponding series in the previously known elements in all respects. More particularly, in the slot series in the previously known elements corresponding to series 73, there was a longitudinally elongated slot in the position occupied by slot 77 in element 60 and in the series corresponding to series 74, there was a laterally elongated slot between each adjacent pair of the groups of three slots corresponding to the groups of three slots 78, the outer end of this laterally elongated slot being aligned with the outer sides of the slots corresponding to slots 78.

It has been demonstrated by test that the elements 60 exhibit greatly improved structural strength when compared with the corresponding previously known elements without any significant loss of versatility in use. Thus, in one test, two lengths of slotted angle material were supported adjacent one another in a horizontally extending position with the wider flanges of the angles extending vertically adjacent one another and the narrower flanges extending horizontally outwardly therefrom in opposite directions. The beam thus provided was supported on two supports placed five feet apart. Load was applied to the span of five feet, thus provided in equal amounts at two points spaced, respectively, one and one quarter feet from each of the supports to provide quarter point loading.

In such a test it was found that the maximum load which could be supported on the beam when it was formed of slotted angle material identical with element 60 and having the various dimensions set forth as preferred in this specification was 4760 lbs. When the same test was given to slotted angle material containing the pattern of slots used in the previously known structural elements which element 60 is compared above but otherwise substantially identical with the slotted angle material described in the preceding sentence, it was found that the maximum load which could be supported on the beam was 4225 lbs. The change from the pattern of slots in the previously known slotted angles to the pattern of element 60 thus produces an increase in structural strength of the order of 12.3%.

It is apparent that many widely different embodiments of this invention may be made without departing from the spirit and scope thereof, and therefore it is not intended to be limited except as in the appended claims.

What is claimed:

1. A structural bar element having two flanges which extend substantially at right angles to each other, each of said flanges having therein a series of elongate slots which is nearer to the juncture of the flanges than is any other series of slots in the flange in which said series is formed, each of said series extending longitudinally throughout the flange length, the slots in the series being arranged in a pattern repeated uniformly throughout the length of the flange and consisting of a plurality of longitudinally extending slots, each having a side thereof adjacent to the juncture of the flanges lying on a single line extending lengthwise of the flange substantially parallel to said flange juncture and following said longitudinally extending slots a single slot having its longitudinal axis substantially perpendicular to the said juncture and each of said last named slots in one of said series having an end thereof aligned with said single line and lying wholly on the side of said single line remote from said juncture.

2. An element as described in claim 1 in which said one flange has therein a second series of elongate slots, said second series extending longitudinally throughout the flange length and substantially parallel to said first series, the slots in the said second series all having their longitudinal axes substantially parallel to said flange juncture.

3. An element as decribed in claim 1 in which the said series of said slots of one of said flanges is identical with the said series in the other flange and in which each slot in the one of said series has its transverse axis substantially in alignment laterally of the element with the transverse axis of a slot in the other series having its longitudinal axis oriented in respect to the flange juncture in the same way as the first mentioned slot.

4. An element as described in claim 3 in which said one flange has therein a second series of elongate slots, said second series extending longitudinally throughout the flange length and substantially parallel to said first series, the slots in the said second series all having their longitudinal axes substantially parallel to said flange juncture and each having its transverse axis in alignment laterally of the element with the transverse axis of slots in each of the other two series which also have their longitudinal axes extending substantially parallel to said flange juncture.

5. A structural bar element having two flanges which extend substantially at right angles to each other, at least one of said flanges having therein a series of elongate slots which is nearer to the juncture of the flanges than is any other series of slots in the flange in which said series is formed, said series extending longitudinally throughout the flange length, the slots in the series being arranged in a pattern repeated uniformly throughout the length of the flange and consisting of a plurality of longitudinally extending slots, each having a side thereof adjacent to the juncture of the flanges lying on a single line extending lengthwise of the flange substantially parallel to said flange juncture and following said longitudinally extending slots a single slot having its longitudinal axis substantially perpendicular to the said juncture and each of said last named slots having one end thereof aligned with said single line and lying wholly on the side of said single line remote from said juncture.

6. An element as described in claim 5 in which said one flange has therein a second series of elongate slots, said second series extending longitudinally throughout the flange length and substantially parallel to said first series, the slots in the said second series all having their longitudinal axes substantially parallel to said flange juncture.

7. An element as described in claim 5 in which the other of said two flanges has therein a series of elongate slots also extending longitudinally throughout the flange length and arranged in a pattern repeated uniformly throughout the length of the flange and consisting of a plurality of slots having their longitudinal axes substantially parallel to said flange juncture followed by a single slot having its longitudinal axis substantially perpendicular to said juncture and in which said slot in one series has its transverse axis substantially in alignment laterally of the element with the transverse axis of a slot of the other series having its longitudinal axis oriented in respect to the flange juncture in the same way as the first mentioned slot.

8. An element as described in claim 7 in which said one flange has therein a second series of elongate slots, said second series extending longitudinally throughout the flange length and substantially parallel to said first series, the slots in the said second series all having their longitudinal axes substantially parallel to said flange juncture and each having its transverse axis in alignment laterally of the element with the transverse axis of slots in each of the other two series which also have their longitudinal axes extending substantilly parallel to said flange juncture.

9. A structural bar element having two flanges which extend substantially at right angles to each other, each of said flanges having therein a series of elongate slots, said series extending longitudinally throughout the flange length, the slots in each series being identical with each other and with the slots in the other series and being characterized by a slot length approximately one and one half times the slot width, the slots in each series being arranged in a pattern repeated uniformly throughout the length of the flange and consisting of a plurality of slots having their longitudinal axes parallel to the juncture of the flanges followed by a single slot having its longitudinal axis perpendicular to the said juncture, the longitudinal spacing of the slots in each series being such that the distance between the transverse axes of adjoining longitudinally extending slots and the distance between the transverse axis of a longitudinally extending slot and the longitudinal axis of an adjoining transversely extending slots are each equal to approximately twice the slot width.

10. An element as described in claim 9 in which one of said flanges has therein a second series of elongate slots, said second series extending longitudinally throughout the flange length and substantially parallel to the other series in said flange, the slots in the said second series all having their longitudinal axes substantially parallel to the said flange juncture, and being arranged in a pattern repeated uniformly throughout the length of the flange and consisting of groups of slots identical in their number and orientation with the said pluralitv of slots in the first series, the longitudinal spacing of the slots in the said second series being such that the distance between the transverse axis of each slot and that of an adjoining slot in a group is equal to approximately twice the slot width.

11. An element as described in claim 10 in which each slot in both series in said one flange has its transverse axis substantially in alignment laterally of the element with the transverse axis of a slot in the series in the other flange having its longitudinal axis oriented in respect to the flange juncture in the same was as the first mentioned slot, in which the distance laterally of the element between the longitudinal axes of the longitudinally extending slots in one of said two series in one flange and the longitudinal axes of the longitudinally extending slots in the other of said two series is equal to approximately a small even multiple of the slot width and in which the longitudinal axes of the longitudinally extending slots in the two identical series are each spaced from the outside of said flange juncture a distance equal to approximately two and one half times the slot width.

12. A structural bar element having two flanges which extend substantially at right angles to each other, at least one of said flanges having therein a series of identical elongate slots, said series extending longitudinally throughout the flange length, the slots in the series being arranged in a pattern repeated uniformly throughout the length of the flange and consisting of a plurality of slots having their longitudinal axes substantially parallel to the juncture of the flanges followed by a single slot having its longitudinal axis substantially perpendicular to the said juncture.

13. An element as described in claim 12 in which the longitudinally extending slots each have the side thereof nearer to the juncture of the flanges lying on a single line extending lengthwise of the flange substantially parallel to said flange juncture, said line also being nearer to the flange juncture than is any other series of slots in the flange in which said series is formed, in which one end of each of said transversely extending slots is aligned with said single line and in which said transversely extending slots lie wholly on the side of said line remote from said juncture.

14. An element as described in claim 12 in which said one flange has therein a second series of elongate slots, said second series extending longitudinally throughout the flange length and substantially parallel to said first series and being located between the said first series and the free edge of said flange, the slots in the said second series all having their longitudinal axes substantially parallel to said flange juncture.

15. An element as described in claim 12 in which the other of the said two flanges has therein a series of slots identical with that in said one flange and in which each slot in one series has its transverse axis substantially in alignment laterally of the element with the transverse axis of the slot in the other series having its longitudinal axis oriented in respect to the flange juncture in the same way as the first mentioned slot.

16. An element as described in claim 15 in which said one flange has therein a second series of elongate slots, said second series extending longitudinally throughout the flange length and substantially parallel to said first series and being located between the said first series and the free edge of said flange, the slots in the said second series all having their longitudinal axes substantially parallel to said flange juncture and each having its transverse axis in alignment laterally of the element with the transverse axis of slots in each of the other two series which also have their longitudinal axes extending substantially parallel to said flange juncture.

References Cited by the Examiner

FOREIGN PATENTS 763,111    12/1956    Great Britain.

FRANK L. ABBOTT, *Primary Examiner.*

JACOB L. NACKENOFF, *Examiner.*

R. S. VERMUT, *Assistant Examiner.*